Patented Mar. 23, 1954

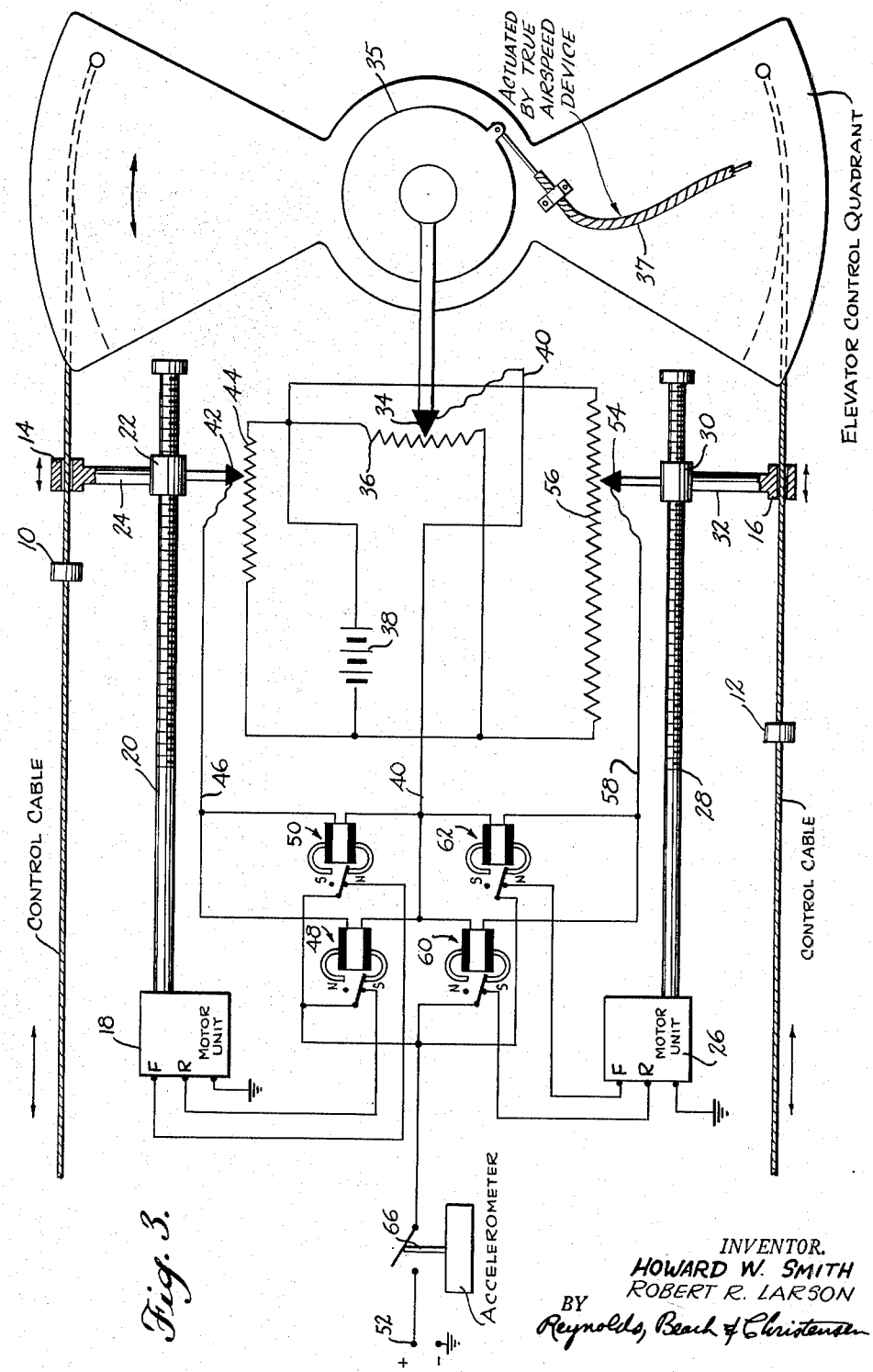

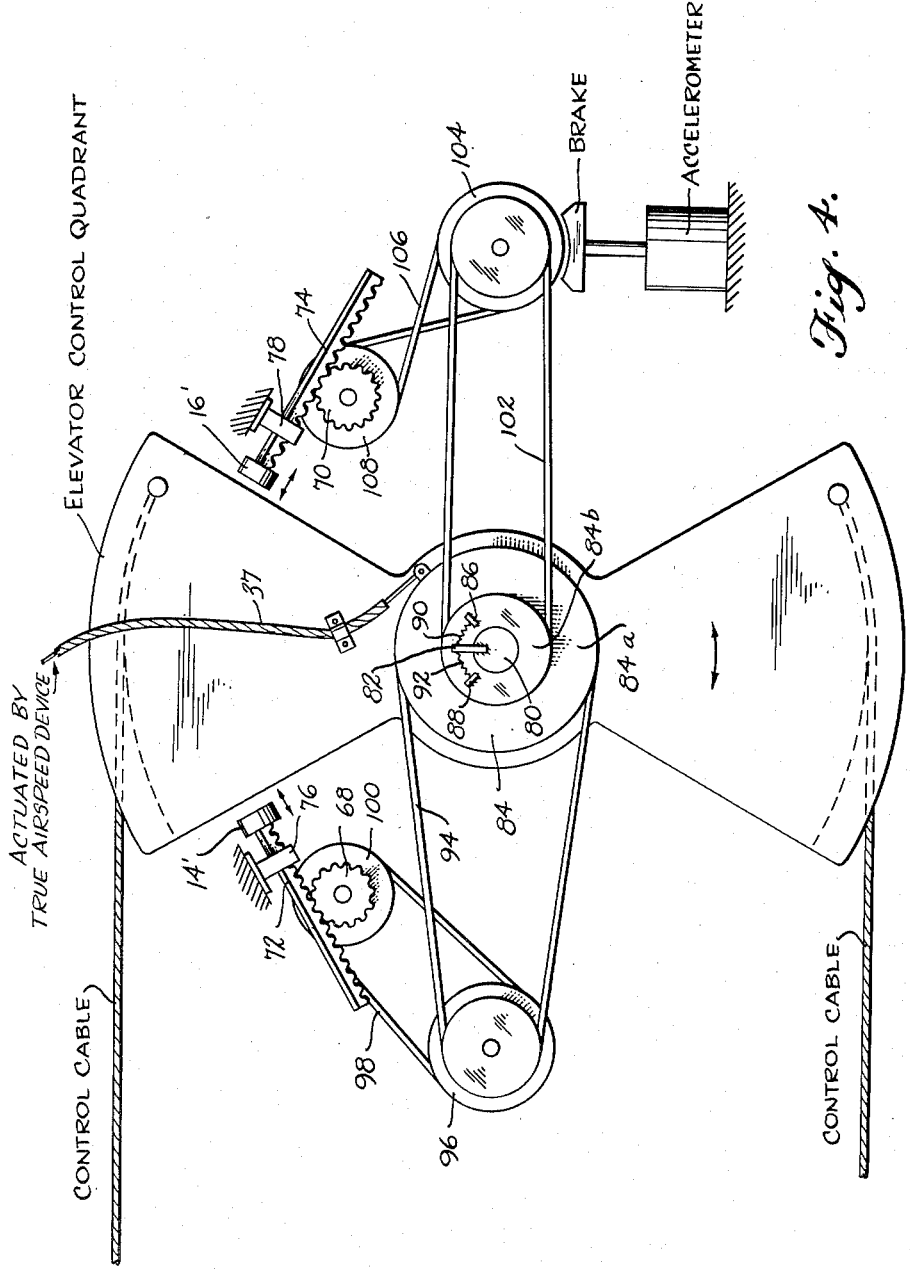

2,673,048

UNITED STATES PATENT OFFICE 2,673,048

AIRPLANE ELEVATOR CONTROL SYSTEM

Howard W. Smith, Seattle, and Robert R. Larson, Mercer Island, Wash., assignors to Boeing Airplane Company, Seattle, Wash., a corporation of Delaware Application April 20, 1951, Serial No. 222,098

6 Claims. (Cl. 244—83)

This invention relates to airplane elevator control systems and more particularly to a system devised to protect airplanes against the possibility of structural overloads caused by sudden excessive elevator deflection and attendant over-acceleration along the airplane's normal axis. The term "normal axis" is herein used in the conventional sense and connotes a line or axis contained in the airplane's plane of symmetry and extending normal to its longitudinal axis. The present invention comprises a control system which at any instant limits the attainable elevator deflection at upper and lower maximum safe values established in accordance with all pertinent factors including air speed, weight, center of gravity location, etc.

Prior to the present invention it had been proposed to adjust elevator control linkage mechanism in accordance with stabilizer trim setting, so that a proportionately greater angle of swing of the elevators would result from a given movement of the pilot's controller at low air speeds than at higher speeds. However, no attempt was made therein to limit elevator deflection at any particular value, nor more especially to do so at a maximum safe value for the airplane as a structure.

The present invention is based upon the observation that the amount of elevator deflection required at a given true air speed to produce a given normal axis acceleration or load factor change is substantially a direct linear function of existing elevator trim angle. Thus the routine act of correctly establishing trim angle for maintaining rectilinear flight with free controls automatically affords a singular basis for determining and establishing maximum permissible elevator deflection at any given value of true air speed.

The protective system employs stops which establish upper and lower elevator deflection limits and are readjusted automatically in response to changes of trim angle. Because the relationship of trim angle to maximum safe elevator deflection is substantially linear the automatic control mechanism necessary for converting information representing elevator trim angle into correct positioning of the stops is relatively simple.

In a practical apparatus employing the protective system, however, it is important to take into consideration the fact that during normal flight of the airplane intermittent adjustments of the elevators are made by the pilot through the controller to steady the airplane's flight along a given path or produce maneuvers. These must be excluded from influencing adjustment of the stops, so that the latter are positioned solely in accordance with level flight trim angle of the elevators at all times.

This may be done, for instance, by effectively averaging the position of the elevators over appreciable periods of time and adjusting the stops on the basis of the average. Alternatively, and as in the preferred forms herein described, a "control signal," whether in terms of voltage, current, shaft position, or other derivative information representing elevator position, is derived continuously but is applied to the stop adjusting mechanism only during the intermittent periods of substantially rectilinear flight, when the elevators must be in trim position. During the intervening periods, that is during periods of appreciable normal axis acceleration, application of the control signal to the stop adjusting mechanism is automatically interrupted. Such interruptions are accomplished by accelerometer means or the like capable of detecting departures of the airplane from substantially rectilinear flight, at which times the elevators will be out of trim.

It will be understood that in the operation of this system should the pilot increase the speed of the airplane, for example, necessitating readjustment of the trim tabs for restoring the elevators to trim in a new position, the stops would further restrict the elevator deflection limits automatically to reduce the maximum deflection angle attainable. The same considerations would govern operation of the system in case of a sudden reduction of weight of the airplane, such as in the case of discharging a heavy bomb load; or in the case of a material shift in the center of gravity location of the airplane toward the rear. On the other hand, the deflection limits would be automatically expanded to increase the maximum deflection angle obtainable, should speed be reduced, weight increased as by refueling in flight, or center of gravity shifted forward, necessitating a new trim position of the elevators. An adjustment factor representing the effect of true air speed is provided continuously to the system to complete the data for fully automatic control of the stops.

While the advantages of the automatic control system are of particular importance in the case of long range, high speed airplanes designed to carry heavy loads, it will be appreciated that the same principles may be applied effectively in other types of airplanes requiring protection against the effects of over-deflection of the elevators.

These and other features, objects and advantages of the invention including certain details of construction of the preferred forms thereof, will become more fully evident from the following description based upon the accompanying drawings.

Figure 3 is a schematic diagram illustrating a preferred form of the system, in which the stops are positioned in accordance with an electric control signal.

Figure 4 illustrates an alternative form in which the stops are positioned by purely mechanical means.

Figure 1:
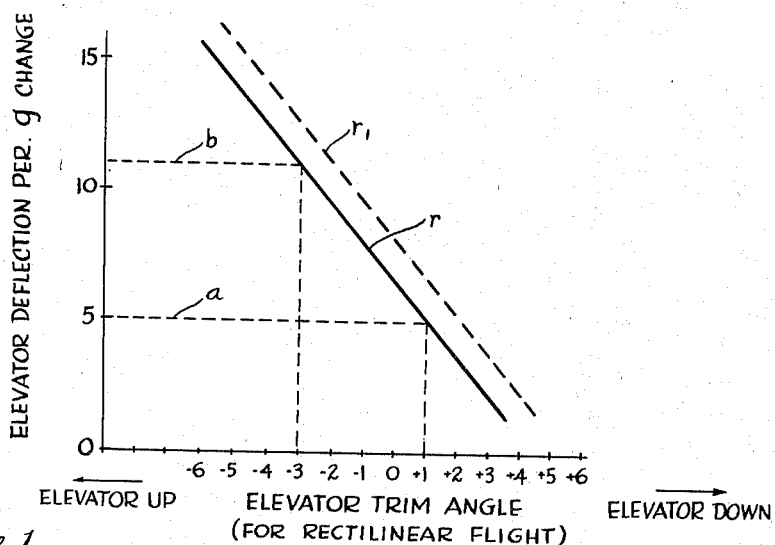
Figure 1 is a graph illustrating the relationship between elevator trim angle for rectilinear flight with free controls, and elevator deflection angle necessary to produce the normal axis acceleration indicated in a typical case.

As the speed of an airplane is increased the trim tabs must be adjusted to lower the elevators in order to restore them to trim position for rectilinear flight with free controls. Decreasing the load or shifting the center of gravity aft in the airplane acts as an increase of air speed, with reference to the effect on elevator trim angle. The remarkable relationship, however, as shown in Figure 1, is that which exists between elevator trim angle and corresponding elevator deflection necessary to produce a given amount of acceleration parallel to the normal axis of the airplane. The relationship is linear, hence lends itself as a highly convenient basis for directly controlling the limits of elevator deflection. The graph line $r$ represents the relationship at one value of true air speed and the line $r_1$, at a lower value of true speed. For convenience in discussion herein it will be assumed that the acceleration of one $g$ (acceleration of gravity) taken in Figure 1 is the permitted maximum for a particular airplane.

Figure 2:
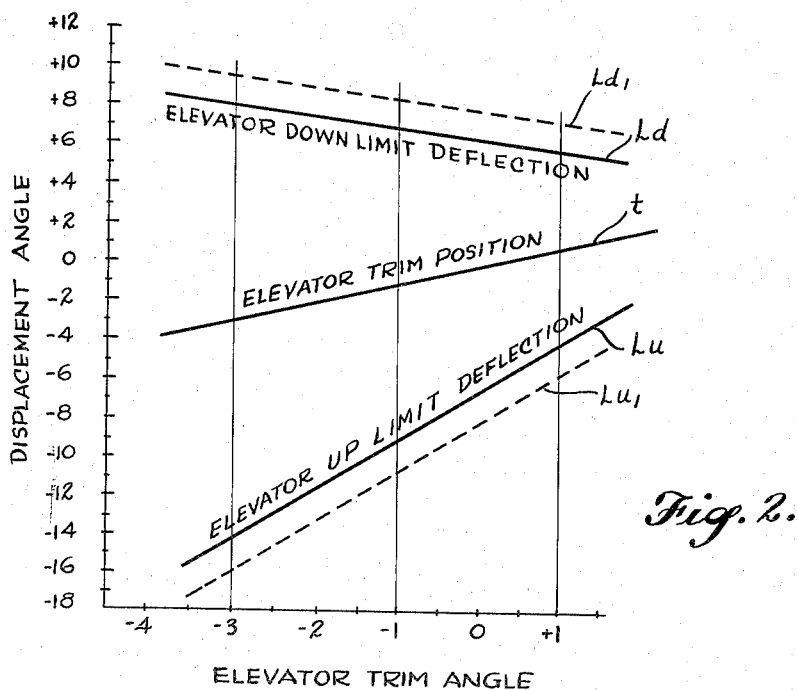
Figure 2 is a graph derived from Figure 1 and illustrating the positional relationships of the stop-defined deflection limits of the elevator, with reference to elevator trim position.

In Figure 2 the significance of the foregoing relationship in terms of permissible deflection is graphically illustrated by plotting the angular position of the elevators at their opposite deflection limits $L_u$ and $L_d$, as a function of elevator trim angle, to correspond to graph line $r$ in Figure 1, and at $L_{u1}$ and $L_{d1}$ to correspond to graph line $r_1$ in Figure 1. Also, the graph of Figure 2 shows a plot $t$ of elevator trim position as a function of itself. It will be seen that the ordinate distances between the line $t$ at any point thereon and corresponding points on the lines $L_u$ and $L_d$, or on the lines $L_{u1}$ and $L_{d1}$ are equal. In terms of control operation this means that when the elevators are in trim position they may be deflected up or down through equal angles from such position, and the angle becomes proportionately greater as elevator trim position is shifted upward.

In the arrangement of Figure 3 the deflection limits of the elevators are established by use of abutments 10 and 12 on the upper and lower control cables connected to the control quadrant. A collar 14 apertured to slide freely on the upper cable comprises an adjustable stop which cooperates with the stop abutment 10, and a similar collar 16 cooperates in the same way with the lower cable and stop abutment 12. The mechanism for adjusting the stop 14 along the upper cable comprises a reversible geared electric motor unit 18 which rotates an actuating screw 20 extending parallel to the upper control cable. A traveling nut 22 is threaded on the screw and carries an arm 24 by which the stop 14 is shifted as the traveling nut moves in one direction or the other along the actuating screw, depending upon the latter's direction of rotation by motor unit 18. The stop 16 on the lower cable is positioned by similar mechanism comprising the motor unit 26, actuating screw 28, traveling nut 30 and stop-supporting arm 32. The reversible motor units are shown as having three terminals, one a ground terminal, one a terminal (F) energizable to drive the unit in an assumed forward direction, and the third a terminal (R) energizable to drive the unit in the reverse direction.

The elevator control quadrant carries a movable potentiometer contact 34 which engages the potentiometer winding 36 connected across the terminals of the battery 38. The electric conductor 40 connected to the contact 34 thus carries a control signal or voltage, the value of which with reference to ground is directly proportional to the angular position of the control quadrant, hence of the elevators, connected thereto. Energization of the reversible motor units for positioning the stops 14 and 16 in accordance with the magnitude of the control signal as a measure of trim angle, is accomplished by relays connected in a null-balance bridge circuit associated with each of the motor units. The traveling nut 22 carries a movable potentiometer contact 42 which engages the potentiometer winding 44 connected across the terminals of the battery 38. The potential with reference to ground appearing on the conductor 46 connected to contact 42 is thereby directly related to the position of the stop 14.

Between the conductors 46 and 40 are connected in parallel the windings of two separate polarized relays 48 and 50 which are polarized in opposite senses. If the potential of the conductor 46 is higher than that of conductor 40, for example, current will flow through the polarized relay windings and will cause one of the relays to close its contacts. On the other hand, if the potential of the conductor 40 is higher than that of the conductor 46, the resulting flow of current through the relay windings will cause the other relay to close its contacts. The contacts of one of these relays are connected in the energizing circuit for motor unit 18, between the forward drive energizing terminal F and the power source terminal 52, whereas the contacts of the other relay are connected in the energizing circuit between the reverse-drive energizing terminal R and such power source terminal, as shown. The connections are such that when an appreciable difference in potential exists between the conductors 40 and 46, such that one of the relays, 48 or 50, is actuated, the motor unit 18 will operate in the correct direction to restore the bridge circuit to balance by moving the potentiometer contact 42 until its potential equals that of conductor 40. Consequently, the stop 14 is positioned by the adjusting mechanism always in accordance with the control signal derived by potentiometer contact 34.

Likewise, the traveling nut 30 carries the potentiometer contact 54 which engages the potentiometer winding 56 connected across the terminals of the battery 38, so that the potential with reference to ground of conductor 58 connected to the contact 54 constitutes a measure of the position of the adjustable stop 16. The polarized relays 60 and 62, having windings connected in parallel between conductors 40 and 50, correspond to the relays 48 and 50, energizing the motor unit 26 to reposition the stop 16 in accordance with differences in potential existing between conductors 40 and 50. Consequently, the stop 16 is also positioned directly in accordance with the control signal derived by potentiometer contact 34.

It will be evident that the adjustment mechanism for each of the stops 14 and 16 is merely one form of servo-mechanism by which the position of the elevator control quadrant is converted into corresponding positions of the respective stops, and that other servo-mechanisms or other types of conversion control apparatus could be used for this purpose, whether electrical, mechanical, electro-mechanical, hydraulic, or otherwise.

Noting that movement of the stops 14 or 16 in the same direction, whether to the right or to the left in Figure 3, is equivalent to opposite relative movement of the stops in terms of displacement angle in the graph of Figure 2, it will be seen that changes in elevator trim position should be accompanied by movement of the stops in the same direction. However, one of the stops should move by a different amount that the other when trim angle changes, because the slope magnitude of the graph $L_u$, for instance, is different from that of the graph $L_d$ in Figure 2. Thus, if under conditions of constant true air speed corresponding to graphs $r$, $L_u$ and $L_d$, for instance, the elevator trim angle is changed from plus one degree to minus three degrees (Figure 1) by counterclockwise movement of the control quadrant, causing the abutment 10 to move to the left and the abutment 12 to the right by an equal amount, the stop 14 should then be moved to the right in Figure 3 by an amount equivalent to approximately two degrees of elevator deflection (corresponding to the vertical distance between lines $a$ and $b$ in Figure 1, less four degrees, representing elevator trim angle change), whereas the stop 16 should be moved to the right by about the equivalent of ten degrees. The travel of the stops during that change is such that in the new elevator trim position the stops will each be spaced from their respective abutments by an amount equivalent to eleven degrees of elevator displacement angle, whereas in their former position, corresponding to the plus one degree elevator trim angle, the respective abutments and stops were separated by the equivalent of five degrees.

The difference between the amounts of travel of the respective stops caused by a given change in the value of the control signal derived by potentiometer contact 34, is established by the design of potentiometers 44 and 56. For this purpose the total effective length of the winding of one of these potentiometers bears the same ratio to that of the other as the ratio between the slopes of the corresponding graph lines ($L_u$ and $L_d$), appearing in Figure 2. Thus in the numerical example mentioned in the preceding paragraph the winding of potentiometer 44 would be shorter than that of potentiometer 56.

It is necessary in the operation of the system to insure that the stops 14 and 16 are positioned only in accordance with elevator trim angle and are not influenced by intermittent deflections of the elevator caused by the pilot in steadying the airplane against disturbing external influences. For this purpose means are provided which cause the control signal derived by potentiometer contact 34 to be "sampled," that is to be applied to the bridge circuits only during the intermittent periods in which the elevator is substantially in its true trim position. In Figure 3 this sampling operation is accomplished with the aid of an accelerometer actuating the switch 66 in the power supply circuit for the electric motor units 18 and 26. This switch remains closed as long as the airplane maintains substantially level flight, at which time there is assurance that the elevators are substantially in their trim position. At the time the control signal derived by potentiometer contact 34 is applied to the relays for operating the electric motor units 18 and 26 if necessary to reposition the stops 14 and 16.

However, should the airplane veer from its course, up or down, causing the pilot to apply a corrective deflection to the elevators away from their trim position, the accelerometer, in responding to the normal axis acceleration of the airplane veering from its course, would in effect detect movement of the elevators out of trim position. The switch 66 would then automatically be opened. Transient deflection of the elevators out of trim position, therefore, although actuating the relays, does not change the positions of the stops 14 and 16 because with the switch 66 open no energy is available from the power supply to operate the electric motor units 18 and 26. When the airplane returns to level flight, the accelerometer automatically recloses the switch 66, and the energy source for operating the motor units is reestablished. If it happens that the speed or load of the airplane has been changed in the meantime, so that the correct trim angle of the elevators is different after a transient condition than it was immediately before, the stops 14 and 16 will move to new positions.

Thus it will be seen that the stops are positioned in accordance with true elevator trim angle and are not influenced by intermittent fluctuations of the elevators imposed by the pilot for stabilizing flight of the airplane.

The accelerometer is sufficiently sensitive if it detects accelerations along the normal axis of the airplane in excess of about plus or minus 0.05 $g$ (acceleration of gravity), to open the switch 66. Greater sensitivity than this would be unnecessary because the amount of elevator deflection away from trim position accompanying lesser amounts of normal axis acceleration would be negligible in the normal case.

As an instrument for the purpose described, it will be observed that the accelerometer is subject to the constant acceleration of gravity during level flight of the airplane and that the accelerations up or down which cause opening of the switch 66 are superimposed upon that constant value of acceleration. During a steep climb or glide, however, the accelerometer is subjected to only a fraction of the pull of gravity, because the normal axis of the airplane is inclined. At that time the accelerometer would respond as if to an acceleration downward even though the airplane followed a straight course. In such a case the switch 66 would remain steadily open and the system rendered inoperative. Thus for some types of airplanes a simple spring and weight type accelerometer operating the switch 66 may be inadequate unless control is desired only for level flight.

In the case of a long range bomber airplane, however, a simple type of accelerometer for controlling the switch 66 will be sufficient to give the desired protective control in most all normal rectilinear flight of the loaded bomber, whether during level flight or during periods of rectilinear inclined flight. This is true because the angle from the horizontal at which a loaded bomber climbs or glides is usually so small that the accelerometer, selectively responsive to normal axis acceleration, would not be actuated to open switch 66 merely as a result of the very slight reduction of the gravity component acting on the accelerometer.

In the case of airplanes expected to fly at appreciable angles of incline a simple accelerometer controlling the switch 66 may be replaced by a compensated accelerometer which is insensitve to changes of the gravity component acting thereon, due to change of incline of the airplane's axis. In some instances a rate gyro to open the switch 66 during vertical turns and changes of attitude of the airplane might be used as a substitute for an accelerometer.

The above description of the nature and operation of the system is complete with respect to conditions obtaining at a given constant value of true air speed corresponding to the curve $r$ in Figure 1. However, it has been found that this curve will be shifted up or down as the true air speed decreases or increases, respectively. In order to compensate for variations in true air speed the potentiometer arm or wiper 34 is carried by a dial 35 adjustably mounted on the quadrant. The dial in turn is positioned, through a Bowden wire 37 automatically in accordance with the existing setting or position of a suitable true air speed indicating device (not shown), which may be of a conventional type.

In the purely mechanical form of apparatus appearing in Figure 4, the elevator deflection limit stops 14' and 16' cooperate directly with the elevator control quadrant and are adjusted in position by means of pinions 68 and 70 engaging gear racks 72 and 74 which carry the respective stops. The rack 72 is guided by a fixed support 76 for longitudinal movement therein. The line of movement is tangent to a circular arc centered at the quadrant axis, the point of tangency being that at which the stop abuts the quadrant in the latter's mid-point of swing between extreme limits established by that stop. The same is true of the rack 74 guided by the fixed guide 78. Thus although the stops are not adjusted along circular paths, nevertheless the total angle of movement of the quadrant is not great, so that it may be assumed that a given movement of a stop in all portions of its range of adjustment will change the angular limit of the elevators by the same amount. In the arrangement of Figure 3, the stops and stop abutments both shift in straight paths, hence adjustment of the stops has a linearly related effect on maximum deflection angle of the elevators.

The control quadrant in Figure 4 has a shaft 80 rotatable therewith to swing an arm 82 projecting radially from such shaft. A double sheave 84, rotationally supported on the shaft 80, carries a pair of angularly spaced spring abutments 86 and 88 which project from the end face of such sheave into the general plane of the arm 82 at right angles to the quadrant axis. Centering springs 90 and 92 are connected between the end of the arm 82 and the respective spring abutments 86 and 88, acting oppositely on the sheave until the abutments are spaced by equal angles from the arm 82.

The double sheave 84 has a large-diameter sheave portion 84a rotatively connected to the pinion 68 through a drive belt 94, double sheave 96, a second drive belt 98, and a sheave 100. The double sheave 84 also has a small-diameter sheave portion 84b, rotatively connected to the pinion 70 through a drive belt 102, double sheave 104, a second belt drive belt 106 and a sheave 108. As shown, the belt 106 is crossed so that as the sheave 84 rotates in one direction the stops 14' and 16' will both move either toward or away from the control quadrant between them. However, because of the difference in diameter of the sheave portions 84a and 84b, the stops move at different rates, the ratio in the rates of movement, hence the displacement of the stops, being equal to the ratio of slopes of the graph lines $L_u$ and $L_d$ in Figure 2, as previously discussed.

The sheave system rotating the pinions is permitted to effect adjustments of the stops only when the airplane is in rectilinear flight, just as in the preceding form of the system, appearing in Figure 3. In this case, "sampling" of the elevator angle only when the elevator is in trim position is effected by means of an accelerometer-actuated brake 110 which engages the periphery of one of the sheaves at all other times. The brake is applied so that the entire sheave system is locked when the airplane departs from rectilinear flight with sufficient acceleration along the normal axis of the airplane to actuate the accelerometer. Thus the brake 110 is similar in its operation to the switch 66 in Figure 3. The springs 90 and 92 permit the elevator quadrant to rotate freely within the range established by the stops despite application of the brake 110 to lock the stop adjusting system.

However, when the airplane returns to a given rectilinear flight path, and absence of normal axis acceleration permits release of the brake 110, the centering springs 90 and 92 will rotate the double sheave 84 to readjust the stops if the trim angle of the elevators is different than it was before the transient condition. Thus the centering springs store energy which is expended to adjust the stops should trim angle be changed.

It will be appreciated, of course, that the simplified mechanical arrangement appearing in Figure 4 could be replaced readily by equivalent mechanism capable of converting angle of the elevators when in trim position into movement of stops, in accordance with the principles of the invention. The arrangement in Figure 4 serves primarily to illustrate one possible way of accomplishing that result.

It will likewise be seen that the invention broadly relates to any system which automatically establishes maximum elevator deflection angle in accordance with the maximum safe value thereof, which value is linearly related to elevator trim position at a given value of true air speed. In this regard any apparatus or device which is capable of deriving effective trim angle substantially independent of superimposed elevator fluctuations effected by the pilot during rectilinear flight may be used to provide the control signal. The technique of "sampling" a control signal at selected times during which it is probable, or indeed practically certain, that the elevators are in trim is the preferred technique, but others may be used, as previously mentioned.

We claim as our invention:

1. An airplane elevator control system comprising, in combination with an elevator and an elevator positioning control, adjustable upper and lower elevator limit position stops establishing upper and lower elevator deflection limits above and below a given elevator trim position, respectively, means actuated by trim adjustments of the elevator and means controlled by said latter means to adjust said stops automatically in response to changes in elevator trim position for progressively lowering said upper limit position while progressively raising said lower limit position with progressive movement of said positioning control in the direction from minus to plus elevator trim angle, and similarly for raising said upper limit position and lowering said lower limit position with reverse movement of said control.

2. The control system defined in claim 1, wherein the first-mentioned means includes means responsive to normal axis acceleration of the airplane preventing adjustment of the stops during substantial deviations of the airplane from rectilinear flight.

3. An elevator control system comprising, in combination with an elevator and an elevator positioning control, adjustable upper and lower elevator limit position stops establishing upper and lower elevator deflection limits spaced substantially equally above and below a given elevator trim position, respectively, means responsive to elevator trim adjustments, and stop adjusting means controlled by said latter means for reducing said spacings automatically at substantially equal linear rates with progressive change of elevator trim position in the direction from minus to plus elevator trim angle, and similarly for increasing said spacings with reverse change of elevator trim position.

4. The control system defined in claim 3, and means responsive to air speed, also actuating the stop adjustment means for automatically increasing or decreasing the spacings in response to decrease or increase of such air speed.

5. An airplane control system comprising an elevator and an elevator positioning control, abutment means secured to and movable with said positioning control, adjustable stop means cooperating with said abutment means to limit displacement of said elevator positioning control in both directions, mechanism including an element arranged to be displaced in response to variations in air speed, a signal generator, means responsive to displacement of said elevator positioning control and said element for causing said generator to produce a control signal in a sense corresponding to the algebraic sum of the displacements of said elevator positioning control and said element, means responsive to control signals from said generator to displace said stop means in directions corresponding to the sense of said signals, and means connected to said stop means and responsive to displacement of said stop means for adjusting said generator to zero signal condition, whereby said stop means will occupy different positions corresponding to different settings of said elevator positioning control and said element.

6. An airplane control system comprising, in combination with an elevator and an elevator positioning control, adjustable upper and lower elevator limit position stops establishing upper and lower elevator deflection limits spaced substantially equally above and below a given elevator trim position, respectively, means actuated by trim adjustments of the elevator, stop-adjusting means controlled by said latter means for reducing said spacings automatically at substantially equal linear rates with progressive movement of said positioning control in the direction from minus to plus elevator trim angle, and similarly to increase said spacings with reverse movement of said control, the first-mentioned means including means responsive to elevator normal axis acceleration preventing adjustment of said stops by operation of said positioning control during substantial normal axis acceleration of the airplane, and means responsive to airplane air speed further controlling said stop-adjusting means for increasing or decreasing said spacings in response to decreasing or increasing air speeds, respectively.

HOWARD W. SMITH.
ROBERT R. LARSON.

References Cited in the file of this patent

UNITED STATES PATENTS

| Number | Name | Date |
|---|---|---|
| 1,832,159 | Vanderlip | Nov. 17, 1931 |
| 1,882,730 | Avery | Oct. 18, 1932 |
| 2,448,167 | Baak | Aug. 31, 1948 |

FOREIGN PATENTS

| Number | Country | Date |
|---|---|---|
| 946,212 | France | Dec. 13, 1948 |